US009195496B2

(12) United States Patent
Dawson et al.

(10) Patent No.: US 9,195,496 B2
(45) Date of Patent: *Nov. 24, 2015

(54) AUTOMATED CACHING AND MIRRORING OF IMMUTABLE DATA IN DISTRIBUTED VIRTUAL MACHINES VIA NATIVE INTERFACE COMPONENTS

(71) Applicant: International Business Machines Corporation, Armonk, NY (US)

(72) Inventors: Michael H. Dawson, Ottawa (CA); Graeme D. Johnson, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/709,128

(22) Filed: May 11, 2015

(65) Prior Publication Data

US 2015/0248306 A1 Sep. 3, 2015

Related U.S. Application Data

(63) Continuation of application No. 14/485,435, filed on Sep. 12, 2014, now Pat. No. 9,063,772, which is a continuation of application No. 13/312,246, filed on Dec. 6, 2011, now Pat. No. 8,863,129.

(51) Int. Cl.
*G06F 9/44* (2006.01)
*G06F 9/46* (2006.01)
*G06F 9/54* (2006.01)

(52) U.S. Cl.
CPC *G06F 9/465* (2013.01); *G06F 9/44* (2013.01); *G06F 9/46* (2013.01); *G06F 9/466* (2013.01); *G06F 9/54* (2013.01)

(58) Field of Classification Search
None
See application file for complete search history.

(56) References Cited

U.S. PATENT DOCUMENTS 5,511,197 A 4/1996 Hill et al.
5,724,588 A 3/1998 Hill et al.

(Continued)

FOREIGN PATENT DOCUMENTS

CA 2701503 A1 7/2010

OTHER PUBLICATIONS

United States Patent and Trademark Office, Office Action for U.S. Appl. No. 13/312,246, Feb. 27, 2014, pp. 1-27, Alexandria, VA, USA.

(Continued)

*Primary Examiner* — Emerson Puente
*Assistant Examiner* — Benjamin Wu
(74) *Attorney, Agent, or Firm* — Lee Law, PLLC; Christopher B. Lee

(57) ABSTRACT

An initial request for a reference to a data container is sent to a distributed enhanced virtual machine native interface component of a distributed virtual machine in response to receiving an initial request from a remote execution container for the reference to the data container at a distributed enhanced remote execution container native interface component of the distributed virtual machine. A data mirror data structure including immutable data and the reference to the data container received from the distributed enhanced virtual machine native interface component is stored within a local memory storage area. A reference to the locally-stored data mirror data structure is returned to the remote execution container in response to the initial request for the reference to the data container.

20 Claims, 9 Drawing Sheets

(56) References Cited

U.S. PATENT DOCUMENTS

| | | |
|---|---|---|
| 5,951,680 A | 9/1999 | Redlin et al. |
| 6,021,470 A | 2/2000 | Frank et al. |
| 6,269,373 B1 | 7/2001 | Apte et al. |
| 6,438,560 B1 | 8/2002 | Loen |
| 6,442,620 B1 | 8/2002 | Thatte et al. |
| 6,502,103 B1 | 12/2002 | Frey et al. |
| 6,519,764 B1 | 2/2003 | Atkinson et al. |
| 6,598,037 B1 | 7/2003 | Craig et al. |
| 6,901,588 B1 | 5/2005 | Krapf et al. |
| 7,114,152 B2 | 9/2006 | Hogstrom et al. |
| 7,840,951 B1 | 11/2010 | Wright et al. |
| 7,913,240 B2 | 3/2011 | Kielstra et al. |
| 8,881,099 B2 | 11/2014 | Gallagher |
| 2002/0038301 A1 | 3/2002 | Aridor et al. |
| 2002/0199035 A1 | 12/2002 | Christensen et al. |
| 2003/0110312 A1 | 6/2003 | Gunduc et al. |
| 2003/0145315 A1 | 7/2003 | Aro et al. |
| 2003/0200504 A1 | 10/2003 | Atkinson et al. |
| 2004/0015849 A1 | 1/2004 | Sanchez, II |
| 2004/0093586 A1 | 5/2004 | Brockway et al. |
| 2004/0111730 A1 | 6/2004 | Apte |
| 2004/0193608 A1 | 9/2004 | Gollapudi et al. |
| 2004/0199486 A1 | 10/2004 | Gopinath et al. |
| 2006/0167975 A1 | 7/2006 | Chan et al. |
| 2006/0235876 A1 | 10/2006 | Plouffe |
| 2006/0242634 A1 | 10/2006 | Fleischer et al. |
| 2007/0011669 A1 | 1/2007 | Varma et al. |
| 2007/0038986 A1 | 2/2007 | Houser |
| 2009/0106301 A1 | 4/2009 | Krueger et al. |
| 2009/0193404 A1 | 7/2009 | Kielstra et al. |
| 2010/0094945 A1 | 4/2010 | Chan et al. |
| 2011/0078709 A1 | 3/2011 | Dawson et al. |
| 2011/0093865 A1 | 4/2011 | Dawson et al. |
| 2011/0321043 A1 | 12/2011 | Dawson et al. |
| 2012/0197925 A1 | 8/2012 | Balagopalan et al. |
| 2012/0266147 A1 | 10/2012 | Dawson et al. |

OTHER PUBLICATIONS

United States Patent and Trademark Office, Notice of Allowance for U.S. Appl. No. 13/312,246, Jun. 13, 2014, pp. 1-13, Alexandria, VA, USA.

Levon Stepanian, et al., Inlining Java Native Calls At Runtime, Proceedings of the 1st ACM/USENIX International Conference on Virtual Execution Environments (VEE 05), Jun. 11-12, 2005, pp. 121-131, Association for Computing Machinery (ACM), New York, NY, USA.

Author Unknown, DeleteLocalReference Roundtrip Optimization When Implementing JNI Offload in a JVM, Disclosure, IP.com Prior Art Database, Nov. 17, 2009, p. 1 (overview only), Disclosure No. IPCOM000190097D, IP.com, Published on the World Wide Web at: http://174.129.32.184/IPCOM/000190097#.

Olga Aviles Parrales, Authorized Officer/Examiner, European Patent Office/PCT International Searching Authority, International Search Report and Written Opinion for PCT Application No. PCT/EP2012/074066, Mar. 7, 2013, pp. 1-7, Rijswijk, The Netherlands.

Sheng Liang, The Java(TM) Native Interface: Programmer's Guide and Specification, Specification, Jun. 1999, pp. 1-26, Addison-Wesley Longman, Inc. For Sun Microsystems, Inc., Reading, MA, USA.

United States Patent and Trademark Office, Notice of Allowance for U.S. Appl. No. 14/485,435, Feb. 17, 2015, pp. 1-21, Alexandria, VA, USA.

AUTOMATED CACHING AND MIRRORING OF IMMUTABLE DATA IN DISTRIBUTED VIRTUAL MACHINES VIA NATIVE INTERFACE COMPONENTS

BACKGROUND

The present invention relates to distributed virtual machines. More particularly, the present invention relates to hidden automated data mirroring for native interfaces in distributed virtual machines.

Java™ Virtual Machine (JVM®) implementations support the Java™ Native Interface (JNI). The JNI allows Java™ programming language code to call methods written in the C and C++ (native code) programming languages and vice versa. Both the code written in the Java™ programming language and the native code may be executed in the same process and by the same thread as execution transitions between the two code sections.

BRIEF SUMMARY

A method includes, at a distributed enhanced remote execution container native interface component of a distributed virtual machine: sending, in response to receipt of an initial request for a reference to a data container from a remote execution container, the initial request for the reference to the data container to a distributed enhanced virtual machine native interface component of the distributed virtual machine; receiving a data mirror data structure comprising immutable data and the reference to the data container in response to the initial request for the reference to the data container; storing the received data mirror data structure comprising the immutable data and the reference to the data container within a local memory storage area; and returning a reference to the locally-stored data mirror data structure to the remote execution container in response to the initial request for the reference to the data container.

An alternative method includes, at a distributed enhanced virtual machine native interface component of a distributed virtual machine: receiving, from a distributed enhanced remote execution container native interface component of the distributed virtual machine, an initial request for a reference to a data container; identifying immutable data within the data container in response to receipt of the initial request for the reference to the data container; constructing a data mirror data structure that comprises the identified immutable data and the requested reference to the data container; and sending the data mirror data structure comprising the identified immutable data and the requested reference to the data container in response to the initial request for the reference to the data container to the distributed enhanced remote execution container native interface component of the distributed virtual machine.

A system includes a memory and a processor programmed to execute a distributed enhanced remote execution container native interface component of a distributed virtual machine configured to: send, in response to receipt of an initial request for a reference to a data container from a remote execution container, the initial request for the reference to the data container to a distributed enhanced virtual machine native interface component of the distributed virtual machine; receive a data mirror data structure comprising immutable data and the reference to the data container in response to the initial request for the reference to the data container; store the received data mirror data structure comprising the immutable data and the reference to the data container within a local memory storage area of the memory; and return a reference to the locally-stored data mirror data structure to the remote execution container in response to the initial request for the reference to the data container.

An alternative system includes a communication module and a processor programmed to execute a distributed enhanced virtual machine native interface component of a distributed virtual machine configured to: receive, via the communication module, an initial request for a reference to a data container from a distributed enhanced remote execution container native interface component of the distributed virtual machine; identify immutable data within the data container in response to receipt of the initial request for the reference to the data container; construct a data mirror data structure that comprises the identified immutable data and the requested reference to the data container; and send, via the communication module, the data mirror data structure comprising the identified immutable data and the requested reference to the data container in response to the initial request for the reference to the data container to the distributed enhanced remote execution container native interface component of the distributed virtual machine.

DETAILED DESCRIPTION

Figure 1:
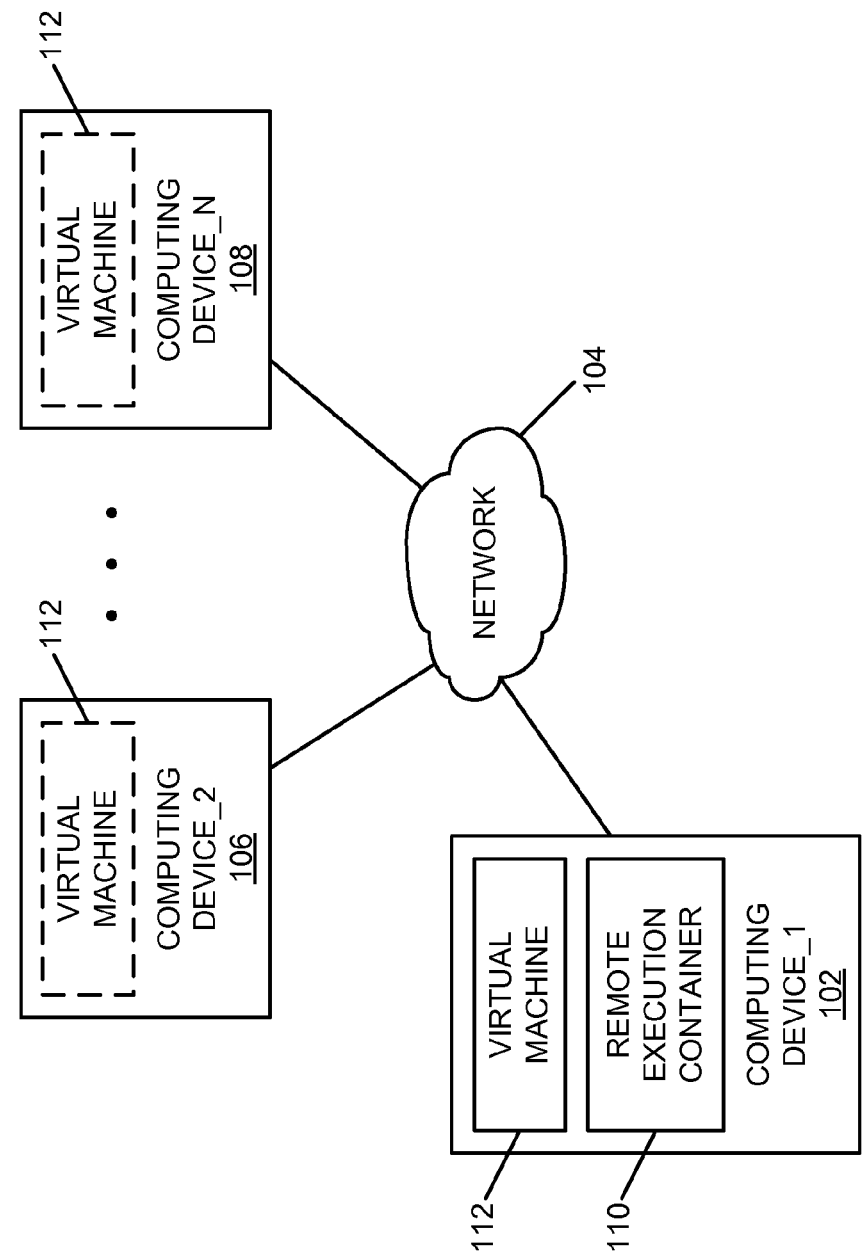
FIG. 1 is a block diagram of an example of an implementation of a system for hidden automated data mirroring for native interfaces in distributed virtual machines according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides hidden automated data mirroring for native interfaces in distributed virtual machines. A native interface of a distributed virtual machine is split into an enhanced remote execution container (REC) native interface component and an enhanced virtual machine (VM) native interface component. The distributed enhanced REC native interface component interfaces with a remote execution container module of the distributed virtual machine. The distributed enhanced VM native interface component interfaces with a virtual machine module of the distributed virtual machine. These distributed native interface components are executed in separate processes, either on the same or on different devices, with the remote execution container and the virtual machine, respectively. In response to requests originating in the remote execution container, the distributed enhanced REC native interface component generates initial requests to the distributed enhanced VM native interface component for references to data containers (e.g., classes). The distributed enhanced VM native interface component responds to the initial requests for references to data containers by providing the requested reference and immutable data associated with the data container encapsulated within a data mirror data structure that represents the data container. For purposes of the present description, "immutable data" includes data that does not change (e.g., method identifiers (IDs) and/or names, field identifiers (IDs) and/or names, and static final field identifiers (IDs) and/or field values that are marked as "final" data values). The enhanced remote execution container native interface component stores the data mirror data structure and responds to requests for immutable data by retrieving the requested immutable data from the data mirror data structure. As such, additional inter-process communications to retrieve immutable data may be eliminated. Additionally, portions of available immutable data may be initially encapsulated within the data mirror data structure and the immutable data may be augmented over time. As such, the interactive processing between the two enhanced native interface components operates to improve efficiency of inter-process communications.

The present subject matter is applicable, for example, to a distributed Java™ Native Interface (JNI) in a distributed Java™ Virtual Machine (JVM®). However, the present subject matter may be applied to any native interface in any distributed virtual machine as appropriate for a given implementation. It is understood that the JNI is an application programming interface (API), and as such the JNI may be referred to herein as a "JNI client" or a "JNI application" interchangeably, and may be referred to for brevity as "JNI" within the context of this understanding and the distributed nature of the interfaces described herein.

The present subject matter utilizes patterns that occur between the Java™ Native Interface (JNI) client and a Java™ Virtual Machine (JVM®) in distributed virtual machines to improve efficiency of inter-process communications. For example, the present subject matter applies to situations such as where a JNI issues a first request to a JVM® for a reference (reference request) to a data container, and issues a subsequent request for data (data request) within that data container using the reference returned from the JVM® in response to the initial reference request. In cases such as these, the device/process executing the JVM® portion of the distributed virtual machine operates in response to the initial reference request to identify immutable data related to the data container (e.g., all immutable data or a portion as described in more detail below) and returns the immutable data to the device/process executing the remote execution container portion of the distributed virtual machine in response to the reference request. The immutable data is stored within local storage associated with the device/process executing the remote execution container portion of the distributed virtual machine as a data mirror data structure and the locally-stored data of the data mirror data structure is made available for subsequent requests directed to the data container of the other distributed process. When subsequent requests are made for data using the reference returned in response to the initial request, if that data is immutable, it is returned from the data mirror data structure within the local storage. As such, delays, processing, and bandwidth associated with round-trip inter-process communications to retrieve the immutable data may be eliminated.

Because immutable data is used within JNI constructs and multiple immutable values may be requested from a single container, the number of remote calls that are eliminated may be significant. The present technique utilizes recognition of the lifecycles of the references returned through the JNI interface without requiring complicated cache management for the data that is mirrored for the remote execution container process.

The JNI returns opaque handles for many of the data elements that are returned in the sequences requiring multiple remote calls. For purposes of the present description, "opaque handles" represent a contract in the application programming interface (API), such that whatever the handle points to is not visible to call directly and a reference has to be handed back in a subsequent call. For example, if a "jclass" is handed back, the jclass cannot be treated like a pointer and the data within the object/class cannot be inspected directly. For such a situation, the reference to the jclass is handed to another function to retrieve the requested data. As such, an opaque handle may be viewed as an indirect reference for purposes of the present description. These opaque handles allow a reference to be returned to the JNI that includes more information than that which is returned in a traditional JVM® without affecting the operation of existing applications. The present subject matter leverages the use of opaque handles to improve distributed JVM® operations, as described above and in more detail below.

The opaque handles are "local references" that have a lifetime limited to the current JNI method call. Further, there is a defined procedure for upgrading opaque handles to "global references" that have a lifetime beyond the single call.

Given the reference returned in the first call, the present technology identifies a set of immutable data related to that reference that may be requested in subsequent calls. The cost of getting/returning more data than was requested in the first call may be considerably lower, perhaps by one or more orders of magnitude depending upon the implementation, than incurring even one additional round trip between the JVM® and the remote execution container.

Two examples of container objects to which the present technology may be applied are "jclass" and "jobject" containers. However, it should be noted that other container objects exist and the present subject matter may be applied to any such container without departure from the scope of the present subject matter.

A "jclass" represents a Java™ programming language-implemented class. Once a reference to the jclass is obtained, subsequent calls may be made to obtain data that does not change for the life of the class (i.e., immutable data). Examples of such data that does not change for the life of the class that may be obtained in subsequent calls include method identifiers (IDs) and/or names, field identifiers (IDs) and/or names, and static final field identifiers (IDs) and/or field values.

A "jobject" represents a Java™ programming language-implemented object instantiated using a jclass. Once a reference to the jobject is obtained, subsequent calls may be made to obtain data that does not change for the life of the object (i.e., immutable data). Examples of such data that does not change for the life of the object that may be obtained in subsequent calls include final field values (e.g., data values).

It should be noted that for purposes of certain debugging platforms, such as Java™ virtual machine tool interface (JVMTI), some of this data may not be immutable when the JVMTI is enabled for a JVM®. In such cases, the optimization may be disabled for data that would otherwise be immutable during normal operations. As such, the operations described herein may further be configurable based upon whether the immutable data remains immutable during debug operations to allow flexibility of use for debugging purposes, while preserving efficiency during normal operational mode for the JVM®.

The present technology includes three techniques that improve efficiency of native interfaces in distributed virtual machines. Initially, when the first call is made to obtain an initial reference to a data container, as the JNI call is processed in the JVM®, instead of returning the reference alone, an additional operation is performed to also extract the immutable data (all or a portion as a configuration option) from the data container and package this immutable data together with the reference into a data mirror (DataMirror). The data mirror is then returned to the remote execution container and a reference to the data mirror is returned to the JNI instead of the reference returned by the JNI call in the JVM®.

Second, an inspection is performed within the JNI implementation (transparent to JNI clients) for all cases were a reference is passed in for processing through the JNI by a native interface to determine whether the references are regular references or references to a data mirror. This may be performed, for example, using low bit tagging or other techniques as appropriate for a given implementation. In cases were the call is passed over to the remote execution container, such as where the request was for non-immutable data or for a non-data related request, the reference is extracted and returned in the data mirror so that it may be used in the request forwarded to the JVM®. In cases were the data that is requested is immutable and stored within the data mirror, the immutable data is extracted from the data mirror and returned without making a call back to the remote execution container.

As noted above and described in more detail below, immutable data may be obtained over time, such as in response to a first request for each item of immutable data, to reduce processing loads associated with collection of immutable data that is not requested. Other configuration options are possible to configure a collection of immutable data within a data mirror other than at the initial reference request and all such options are considered within the scope of the present subject matter.

A third aspect of the present technology is data mirror lifetime management. The lifetime of immutable data within a data mirror may also be configured and managed. For example, if a method/procedure called "DeleteLocalReference" is called with a reference to a data mirror passed in as a parameter, the memory for the entire data mirror may be freed independently of a lifetime of the respective data in the JVM® object. Additionally, in response to completion and return of a JNI method, the memory for all remaining non-global data mirrors may be freed. Further, if a method/procedure called "NewGlobalRef" is called and a reference to a data mirror is passed in as a parameter, a new "global" data mirror may be created that encapsulates the global reference returned from the remote execution container and the information from the original data mirror. As an additional example, if a method/procedure called "DeleteGlobalRef" is called and a reference to a data mirror is passed in as a parameter, the global reference may be extracted and a call to the remote execution container may be made to delete the global reference and then free the memory for the global data mirror. Many other possibilities exist for lifetime management and all are considered within the scope of the present subject matter.

The techniques described herein may be further optimized in several ways. For example, instead of sending all of the immutable data back with the first request for the reference, the data requested over time may be recorded so that the system learns what data to include within the data mirror initially returned. As such, the most-used data or a subset of the most-used data may be included within the initial data mirror. Additionally, a data mirror may be built over time by only sending back a portion of the immutable data on the first call, with subsequent calls filling in the data mirror as appropriate for a given implementation. The amount of data sent for each request may be based on available data space within a packet on the given network to utilize the available payload area without requiring an additional transmission initially. Then on subsequent requests, an additional packet may be filled to capacity and the data mirror may be built over time while efficiently utilizing packet payloads and network bandwidth. Further, instead of sending all of the data back on the first call, an empty or only partially-filled in data mirror may be initially sent and populated as subsequent calls for immutable data are made such that on the second request for any piece of immutable data, the data request may be satisfied locally from the data mirror. This may be particularly useful if the original reference is upgraded to a global reference and cached, which may be used, for example, with frequently used classes. Many other optimizations to the present subject matter are possible and all are considered within the scope of the present subject matter.

It should be noted that conception of the present subject matter resulted from recognition of certain limitations associated with native interfaces in distributed virtual machines. For example, it was observed that it is possible to construct a distributed virtual machine (e.g., a distributed JVM®) such that the native code (e.g., code writing in the C or C++ programming languages) is executed in one or more remote execution containers that may be hosted in separate processes on the same or different computing devices from where the Java™ programming language code is executed (e.g., a split virtual machine). It was further observed that for a split virtual machine, the native code is unaware that it is executing separately from the JVM® and that this separation prevents misbehaved native code from destabilizing the JVM® and enables execution of the native code in a different environment (e.g., security context, pointer width, endian, etc.) from the main JVM®. However, it was also observed that in such a split virtual machine, the cost of the method/procedure calls between the Java™ programming language code and the native code (e.g., cross-process/cross-machine calls) have greater overhead and latency relative to non-distributed virtual machines, of a potential one or more orders of magnitude depending upon the implementation, and round-trip communications between the distributed code sections consumed time, consumed bandwidth, and delayed processing. It was also observed that with the standardized Java™ Native Interface (JNI), an application often has to make multiple calls to get the information needed to complete an action. For example, in order to get the contents of a field within an object, the application first makes a call to get the class for the object, then makes a call to get an identifier (ID) for the field of the class, and then makes the call to get the contents of the field itself, resulting in six (6) inter-process messages. It was additionally observed that in a distributed JVM®, each of these six messages/steps will incur a time-consuming round trip. In view of these several observations, it was recognized that data mirroring may be used to reduce communication latency, bandwidth, and processing time, and that the data mirroring may be hidden from application-level constructs without requiring a change to the application programming interface (API) for an application to make the data mirroring transparent to future and existing applications that utilize such an API. The present subject matter improves overhead and latency associated with such processing within distributed virtual machines by providing hidden automated data mirroring for native interfaces in distributed virtual machines, as described above and in more detail below. As such, improved operations for distributed virtual machines may be obtained through use of the technology described herein.

The hidden automated data mirroring for native interfaces in distributed virtual machines described herein may be performed in real time to allow prompt data mirroring between distributed processes of virtual machines. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for hidden automated data mirroring for native interfaces in distributed virtual machines. A computing device_1 102 communicates via a network 104 with a computing device_2 106 through a computing device_N 108. The computing device_1 102 executes a remote execution container 110 that interfaces with a virtual machine 112 executed by one of the computing device_1 102 through the computing device_N 108 to form a distributed virtual machine. The virtual machine 112 may include, for example, a Java™ Virtual Machine (JVM®) or other Java™ programming language process, as appropriate for a given implementation. The remote execution container 110 and the virtual machine 112 are operated by different processes/threads, whether collocated within the single computing device_1 102 or physically distributed across different computing devices.

The remote execution container 110 includes native code (e.g., C and/or C++ programming language code) executing in one process/thread that interfaces with Java™ programming language code within the virtual machine 112 executing in a different process/thread (or device as appropriate for a given implementation). It should be noted that code written in any language that may support C/C++ programming language calling conventions may be utilized for native code implementation. As such, C and C++ are used for ease of reference herein and any references herein to native code, including any to the C and/or C++ programming language, are considered to include references to any such other language(s). It should also be noted that the virtual machine 112 within each of the computing device_2 106 through the computing device_N 108 is illustrated with dashed-lines to illustrate flexibility with respect to location of the virtual machine 112. It should also be noted that the remote execution container 110 may also be operated within one or more of the computing device_2 106 through the computing device_N 108 without departure from the scope of the present subject matter.

It should be noted that the respective computing devices 102 through 108 may be portable computing devices, either by a user's ability to move the computing devices to different locations, or by the respective computing device's association with a portable platform, such as a plane, train, automobile, or other moving vehicle. It should also be noted that the respective computing devices may be any computing device capable of processing information as described above and in more detail below. For example, the computing devices may include devices such as a personal computer (e.g., desktop, laptop, etc.) or a handheld device (e.g., cellular telephone, personal digital assistant (PDA), email device, music recording or playback device, watch, etc.), server devices, or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
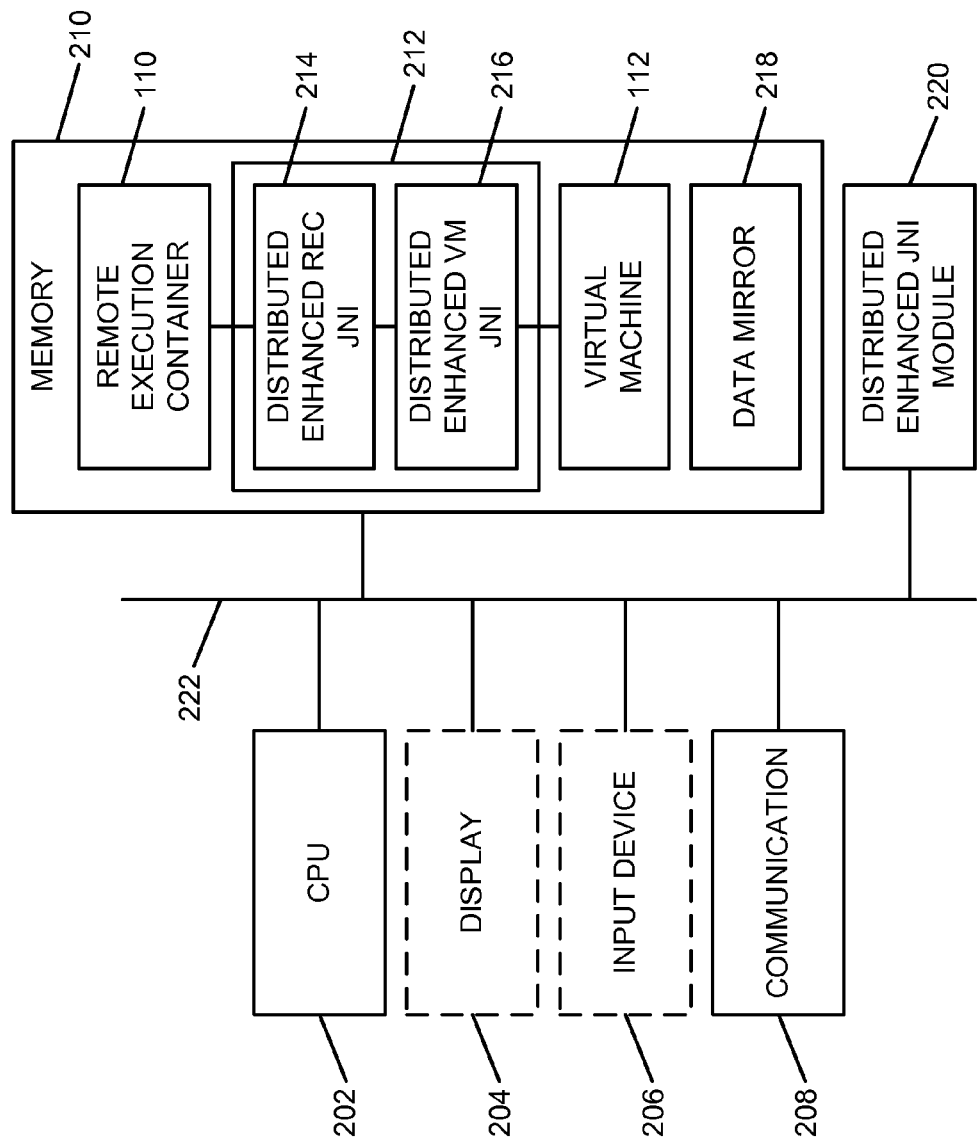
FIG. 2 is a block diagram of an example of an implementation of a core processing module capable of performing hidden automated data mirroring for native interfaces in distributed virtual machines according to an embodiment of the present subject matter.

FIG. 2 is a block diagram of an example of an implementation of a core processing module 200 capable of performing hidden automated data mirroring for native interfaces in distributed virtual machines. The core processing module 200 may be associated with each of the computing device_1 102 through the computing device_N 108, as appropriate for a given implementation. Further, the core processing module 200 may provide different and complementary processing of data mirroring in association with each implementation, as described in more detail below.

As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.). Further, for a distributed virtual machine implementation using different processes/threads on a single device, the sending and receiving is understood to operate between processes/threads.

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes the remote execution container 110 and the virtual machine 112. Each of the remote execution container 110 and the virtual machine 112 interface with a distributed enhanced Java™ Native Interface (JNI) module 212. The distributed enhanced Java™ Native Interface (JNI) module 212 includes two interface components, a distributed enhanced remote execution container (REC) JNI component 214 and a distributed enhanced virtual machine (VM) JNI component 216, that interact with one another to provide the functionality of the distributed enhanced JNI module 212. The distributed enhanced REC JNI component 214 further interfaces with the remote execution container 110, and the distributed enhanced VM JNI component 216 further interfaces with the virtual machine 112.

The distributed enhanced JNI module 212 operates to implement the present subject matter by responding to reference and/or data requests with additional immutable data. The distributed enhanced JNI module 212 operates to implement the present subject matter by creating a data mirror for immutable data to reduce communication interactions between the remote execution container 110 and the virtual machine 112. A data mirror storage area 218 stores created data mirrors, as described above and in more detail below.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A distributed enhanced JNI module 220 is also illustrated as an alternative implementation of the distributed enhanced JNI functionality described herein. The distributed enhanced JNI module 220 represents a hardware module implementation of the distributed enhanced JNI module 212. As such, the remote execution container 110 and the virtual machine 112 may interface via the distributed enhanced JNI module 220 to perform the respective processing associated with each of the respective modules, or the distributed enhanced JNI module 212 may be implemented at the process level without departure from the scope of the present subject matter.

The distributed enhanced JNI module 220 may implement both the distributed enhanced REC JNI component 214 and the distributed enhanced VM JNI component 216 for single platform implementations. Alternatively, multiple and complementary distributed enhanced JNI modules 220 that each implement one of the distributed enhanced REC JNI component 214 and the distributed enhanced VM JNI component 216 may be utilized on different devices to implement the distributed enhanced JNI module 220 across multiple platforms.

Though the distributed enhanced JNI module 220 is illustrated as a component-level module for ease of illustration and description purposes, it should be noted that the distributed enhanced JNI module 220 may include any hardware, programmed processor(s), and memory used to carry out the functions of this module as described above and in more detail below. For example, the distributed enhanced JNI module 220 may include additional controller circuitry in the form of application specific integrated circuits (ASICs), processors, and/or discrete integrated circuits and components for performing communication and electrical control activities associated with the respective devices. Additionally, the distributed enhanced JNI module 220 may include interrupt-level, stack-level, and application-level modules as appropriate. Furthermore, the distributed enhanced JNI module 220 may include any memory components used for storage, execution, and data processing for performing processing activities associated with the module.

It should also be noted that the distributed enhanced JNI module 220 may form a portion of other circuitry described without departure from the scope of the present subject matter. Further, the distributed enhanced JNI module 220 may alternatively be implemented as an application stored within the memory 210, such as described above. In such an implementation, the distributed enhanced JNI module 220 may include instructions executed by the CPU 202 for performing the functionality described herein. The CPU 202 may execute these instructions to provide the processing capabilities described above and in more detail below for the core processing module 200. The distributed enhanced JNI module 220 may form a portion of an interrupt service routine (ISR), a portion of an operating system, a portion of a browser application, or a portion of a separate application without departure from the scope of the present subject matter.

The CPU 202, the display 204, the input device 206, the communication module 208, the memory 210, and the distributed enhanced JNI module 220 are interconnected via an interconnection 222. The interconnection 222 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

For purposes of the present description, the following pseudo code examples represent actions originating at a native interface, such as the distributed enhanced JNI module 212 or the distributed enhanced JNI module 220, operating in conjunction with a remote execution container, such as the remote execution container 110. The first example pseudo code below represents a query to a virtual machine from a remote execution container to find a class associated with the virtual machine.

jclass cls=(*env)→FindClass(env, "com/company/example/TestClass");

This first example pseudo code may be used to retrieve a class reference to a class named "TestClass." The variable "cls" is assigned the class reference.

The following second example pseudo code represents a request to obtain a field identifier (ID) associated with a data element of the class referenced by the "cls" variable.

jfieldID a=(*env)→GetFieldID(env, cls, "a", "I");

This second example pseudo code may be used to retrieve a field identifier (ID) of a data element of the class referenced in the "cls" variable. As described above, a field identifier (ID) is considered immutable data as it will not change over a given instantiation of a class. Within the present example, it is assumed that the data element referenced by the field identifier (ID) is of type integer and has not been marked "final," such that the value of the actual data element is not immutable and may change over time.

The following third example pseudo code represents a request to obtain a value assigned to the integer data element represented by the obtained field identifier.

jint avalue=(*env)→GetIntField(env, allValues, a);

As described above, based upon the observations that lead to the conception of the present subject matter, each of these three operations would result in one round-trip communication between the remote execution container and the virtual machine. However, based upon the present subject matter, the number of round-trip communications may be reduced, as described in association with FIG. 3 below.

Figure 3:
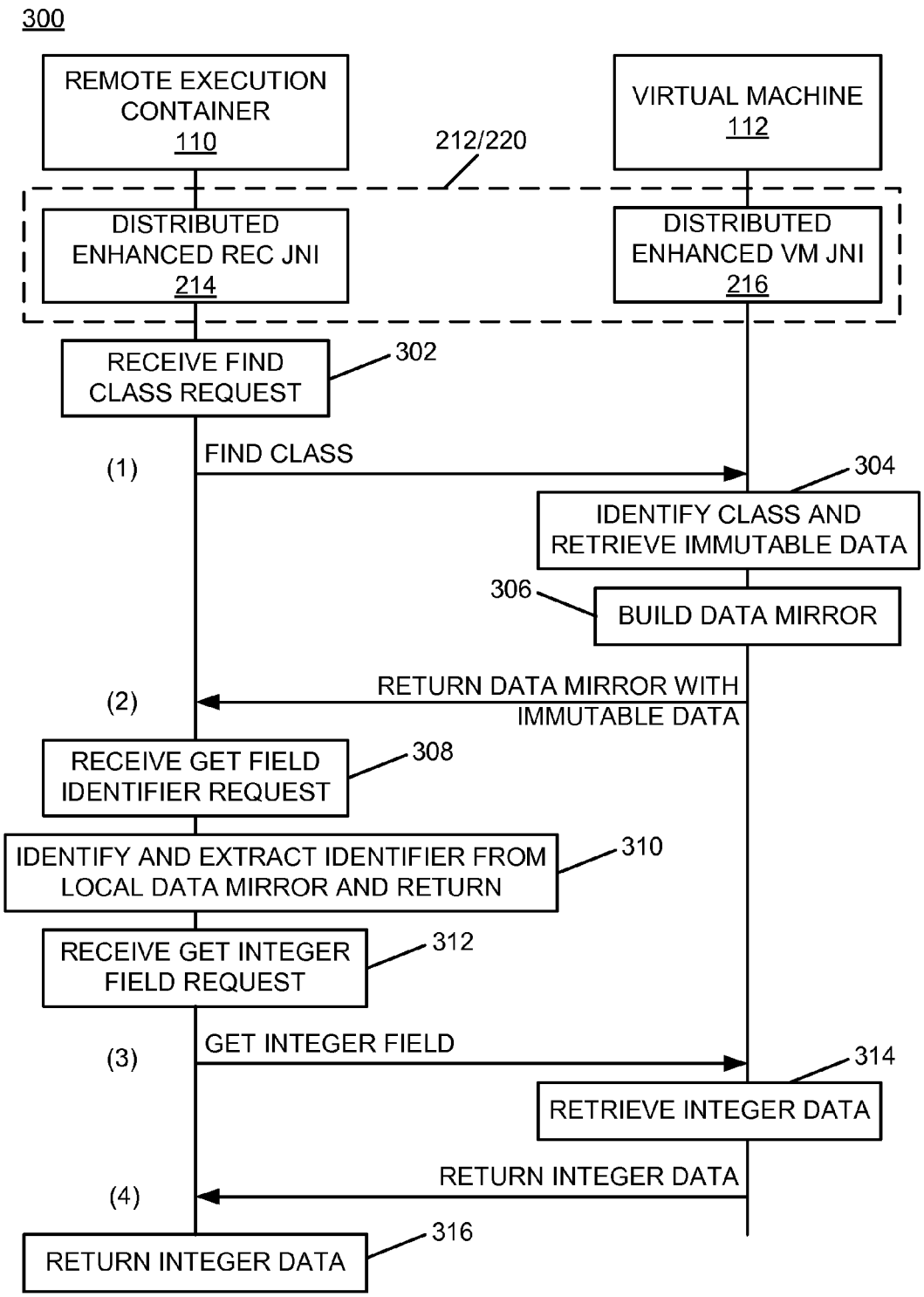
FIG. 3 is a message flow diagram of an example of an implementation of a message flow for hidden automated data mirroring for native interfaces in distributed virtual machines with a data mirror constructed at a distributed virtual machine component in response to a request for a class reference according to an embodiment of the present subject matter.

FIG. 3 is a message flow diagram of an example of an implementation of a message flow 300 for hidden automated data mirroring for native interfaces in distributed virtual machines with a data mirror constructed at a distributed virtual machine component in response to a request for a class reference. The distributed enhanced JNI module 212 (or the distributed enhanced JNI module 220 as appropriate for a give implementation) is shown to include the distributed enhanced REC JNI component 214 and the distributed enhanced VM JNI component 216 that operate to allow the remote execution container 110 to interact with the virtual machine 112, respectively.

Due to crowding within the drawing figure, certain interface communications are described without explicit depiction. However, it is understood that these interface communications form a part of the drawing figure. For purposes of the present examples, it is assumed that a processing sequence, such as the sequence described above in the example pseudo code segments, is processed by the respective elements depicted within FIG. 3. It is further assumed that processing within FIG. 3 is initiated by native code in the remote execution container 110 issuing a request to identify a class (e.g., a "FindClass" request) associated with the virtual machine 112 to the distributed enhanced REC JNI component 214 as described above in association with the first example pseudo code.

At block 302, the distributed enhanced REC JNI component 214 associated with the remote execution container 110 receives a request from the remote execution container 110 for a reference to a class associated with the virtual machine 112 (e.g., a "Find Class" or "FindClass" request) and initiates processing to issue a query to identify a class associated with the virtual machine 112. As described above, the virtual machine 112 may be distributed either within a separate process on the same computing device or as a separate process executing on a different computing device from the remote execution container 110.

The distributed enhanced REC JNI component 214 issues a "Find Class" request (line 1). The distributed enhanced VM JNI component 216 associated with the virtual machine 112 receives the request and identifies the class, and additionally retrieves immutable data associated with the class at block 304. At block 306, the distributed enhanced VM JNI 216 builds a data mirror data structure for the class referenced within the request within a memory, such as the data mirror storage area 218 of the memory 210 associated with a device that is executing the distributed enhanced VM JNI 216, that includes all immutable data identified and retrieved from the identified class. The data mirror storage area 218 may form a portion of a packet processing area associated with inter-process or inter-device communications. The distributed enhanced VM JNI component 216 returns the data mirror data structure with the immutable data and the class reference (line 2) to the distributed enhanced REC JNI component 214 associated with the remote execution container 110.

It should be noted that the distributed enhanced VM JNI component 216 may alternatively use data packet payload filling to return a data mirror data structure that includes a portion of the immutable data, as appropriate for the given implementation, and a data mirror data structure may be built to include more data over time as additional data is requested. Within the present example, it is assumed that at least the field identifiers for data elements of the class are returned within the data mirror with the reference to the class. For example, method names/identifiers, field names/identifiers, and static final field values/field identifiers may be returned.

In response to receipt of the data mirror data structure, the data mirror data structure is stored by the distributed enhanced REC JNI component 214, such as within the data mirror storage area 218 of the memory 210. A reference to the data mirror is returned to the remote execution container 110 (not shown).

At block 308, the distributed enhanced REC JNI component 214 receives a request from the remote execution container 110 for a data field identifier (e.g., "Get Field Identifier") associated the class for which the data mirror data structure was previously received and stored. However, instead of directly issuing a request to the distributed enhanced VM JNI component 216 associated with the virtual machine 112, the distributed enhanced REC JNI component 214 looks into the stored data mirror data structure for the class to determine whether the field identifier associated with the request is already stored within the data mirror data structure. Within the present example, as described above, all field identifiers were returned and stored to the data mirror data structure in response to the initial request. As such, the data field identifier (ID) is identified within and extracted from the stored local data mirror data structure and returned to the remote execution container 110 at block 310. Accordingly, the distributed enhanced REC JNI component 214 uses the local data mirror data structure to eliminate a request to the distributed enhanced VM JNI component 216 associated with the virtual machine 112 and to eliminate an entire round-trip delay associated with the request for the field identifier.

For purposes of the present example, it is assumed that the requested field ID represents an integer value and that the integer was not marked "final" at a time of the initial request for the reference to the class. As such, the integer value was not immutable data and was not returned within the data mirror created by the distributed enhanced VM JNI component 216. However, it should be noted that any values or identifiers that are marked "final" may be considered immutable and may be added to the data mirror data structure to reduce inter-process communications associated with requests for these final values or identifiers.

At block 312, the distributed enhanced REC JNI component 214 receives a request from the remote execution container 110 for the integer field value (e.g., "Get Integer Field") associated with the field identifier retrieved from the stored local data mirror data structure. The distributed enhanced REC JNI component 214 issues a "Get Integer Field" request to the distributed enhanced VM JNI component 216 associated with the virtual machine 112 (line 3). The distributed enhanced VM JNI component 216 processes the request for the integer value and retrieves the integer data value at block 314. The distributed enhanced VM JNI component 216 returns the integer data to the distributed enhanced REC JNI component 214 (line 4). The distributed enhanced REC JNI component 214 returns the integer data to the requesting remote execution container 110 at block 316.

As such, the message flow diagram 300 shows that immutable data may be returned within a data mirror data structure in response to a first request for a class reference and that subsequent request for immutable data may be processed from the locally-stored data mirror data structure. Accordingly, separate inter-process requests for immutable data may be eliminated. As described above, a data mirror may be filled in over time to optimize inter-process bandwidth usage, such as for example, as data identifiers are requested and/or data values are finalized.

Figure 4:
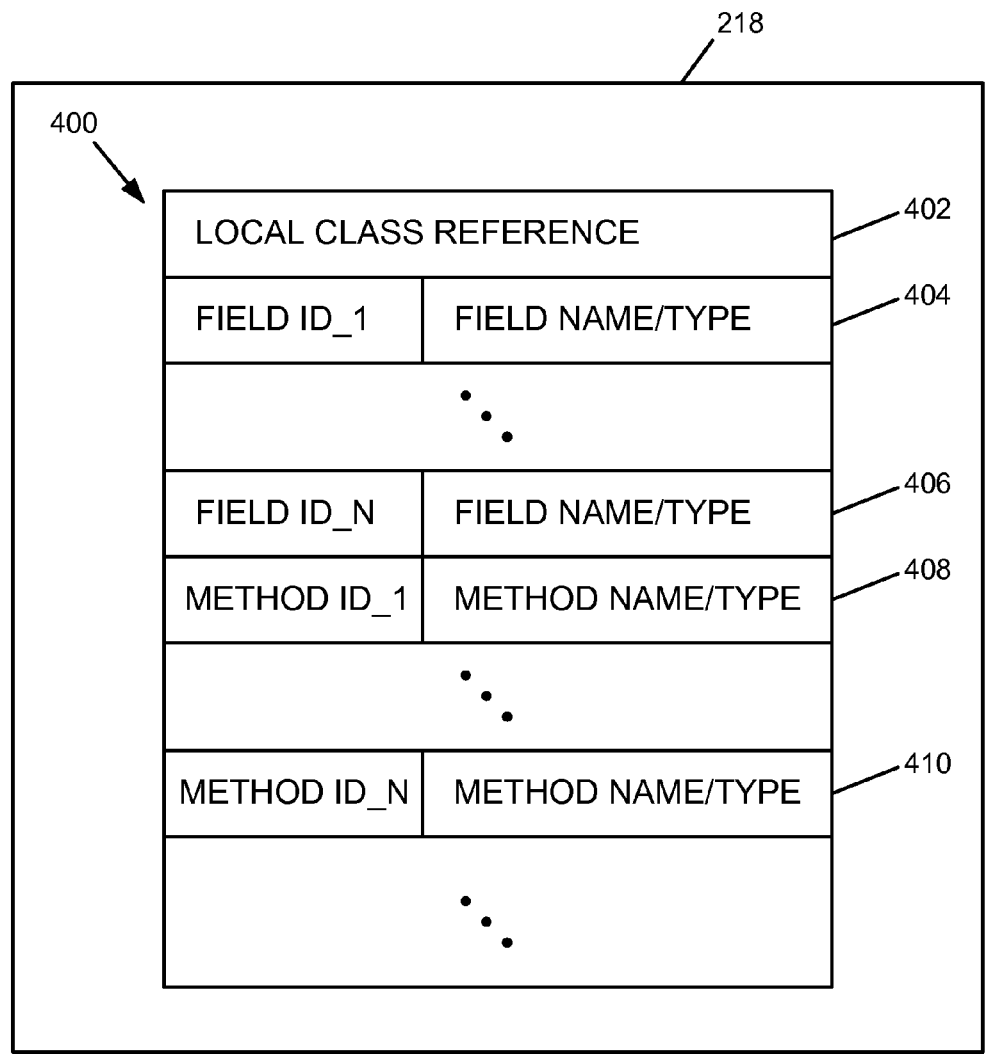
FIG. 4 is a block diagram of an example of an implementation of a data mirror data structure stored within a data mirror storage area of a memory according to an embodiment of the present subject matter.

FIG. 4 is a block diagram of an example of an implementation of a data mirror data structure 400 stored within the data mirror storage area 218 of the memory 210. The data mirror data structure 400 includes a local class reference 402 that references the class associated with the particular data mirror data structure represented by the data mirror data structure 400. A field identifier (ID_1) 404 through a field identifier (ID_N) 406 each include a field identifier and field name/type data pair that represent data fields within the referenced class. A method identifier (ID_1) 408 through a method identifier (ID_N) 410 each include a method identifier and method name/type data pair that represent methods within the referenced class. As described above, additional immutable data values may be stored within a data mirror data structure and all such fields are considered within the scope of the present subject matter. The data mirror data structure 400 may be used, as described above and in more detail below, to access immutable data locally and to reduce round-trip communications between processes.

FIG. 5 through FIG. 8 described below represent example processes that may be executed by devices, such as the core processing module 200, to perform the hidden automated data mirroring for native interfaces in distributed virtual machines associated with the present subject matter. Many other variations on the example processes are possible and all are considered within the scope of the present subject matter. The example processes may be performed by modules, such as the distributed enhanced JNI module 220 and/or executed by the CPU 202 or one or both of the subcomponents of the distributed enhanced JNI module 212, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

Figure 5:
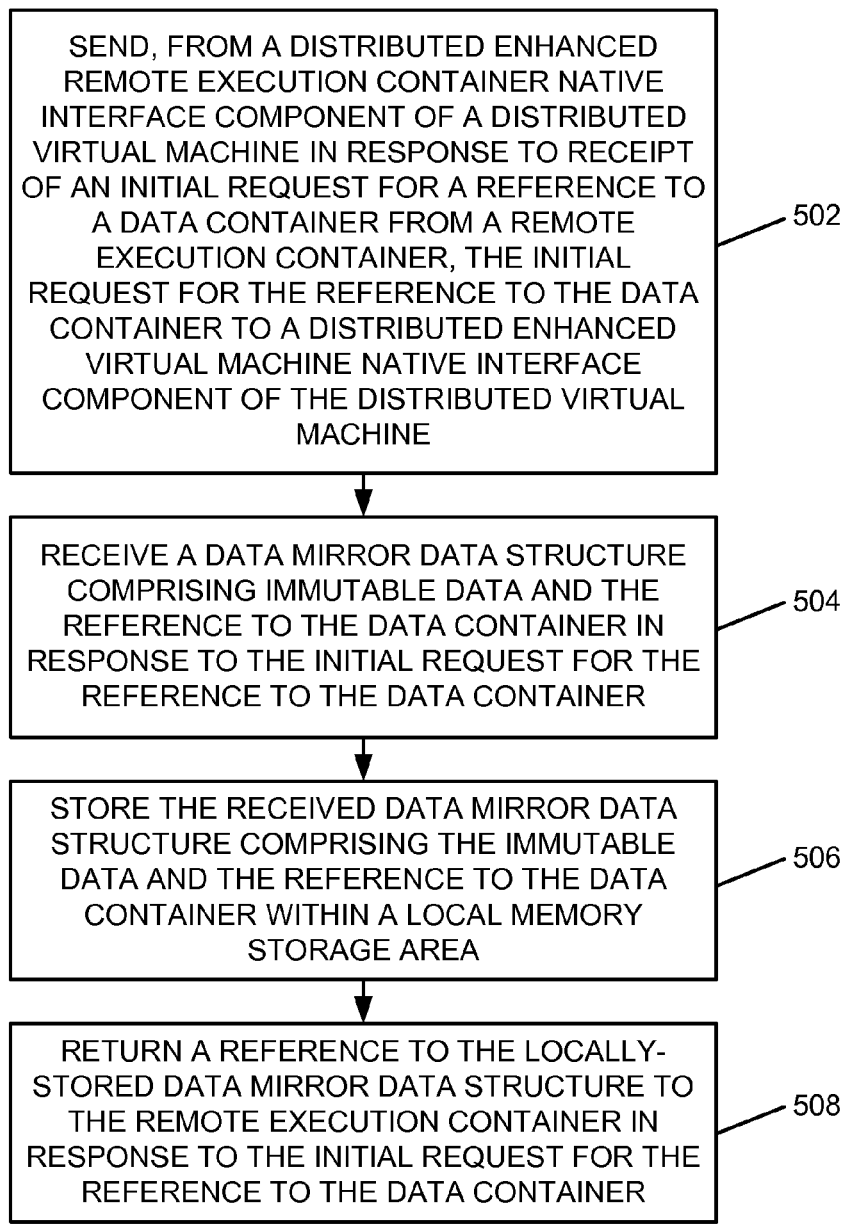
FIG. 5 is a flow chart of an example of an implementation of a process for hidden automated data mirroring for native interfaces in distributed virtual machines at a distributed enhanced remote execution container (REC) native interface module according to an embodiment of the present subject matter.

FIG. 5 is a flow chart of an example of an implementation of a process 500 for hidden automated data mirroring for native interfaces in distributed virtual machines at a distributed enhanced remote execution container (REC) native interface module. At block 502, the process 500 sends, from a distributed enhanced remote execution container native interface component of a distributed virtual machine in response to receipt of an initial request for a reference to a data container from a remote execution container, the initial request for the reference to the data container to a distributed enhanced virtual machine native interface component of the distributed virtual machine. At block 504, the process 500 receives a data mirror data structure comprising immutable data and the reference to the data container in response to the initial request for the reference to the data container. At block 506, the process 500 stores the received data mirror data structure comprising the immutable data and the reference to the data container within a local memory storage area. At block 508, the process 500 returns a reference to the locally-stored data mirror data structure to the remote execution container in response to the initial request for the reference to the data container.

Figure 6:
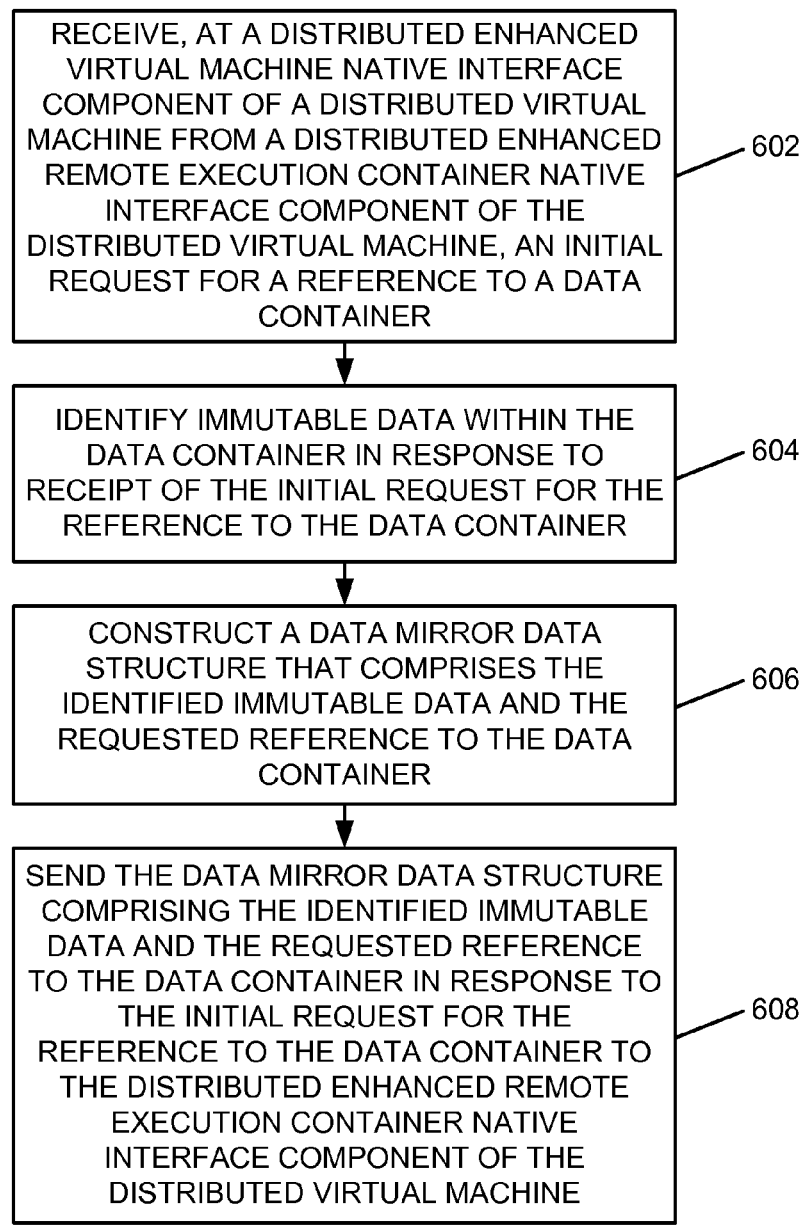
FIG. 6 is a flow chart of an example of an implementation of a process for hidden automated data mirroring for native interfaces in distributed virtual machines at a distributed enhanced virtual machine (VM) native interface module according to an embodiment of the present subject matter.

FIG. 6 is a flow chart of an example of an implementation of a process 600 for hidden automated data mirroring for native interfaces in distributed virtual machines at a distributed enhanced virtual machine (VM) native interface module. At block 602, the process 600 receives, at a distributed enhanced virtual machine native interface component of a distributed virtual machine from a distributed enhanced remote execution container native interface component of the distributed virtual machine, an initial request for a reference to a data container. At block 604, the process 600 identifies immutable data within the data container in response to receipt of the initial request for the reference to the data container. At block 606, the process 600 constructs a data mirror data structure that comprises the identified immutable data and the requested reference to the data container. At block 608, the process 600 sends the data mirror data structure comprising the identified immutable data and the requested reference to the data container in response to the initial request for the reference to the data container to the distributed enhanced remote execution container native interface component of the distributed virtual machine.

Figure 7A:
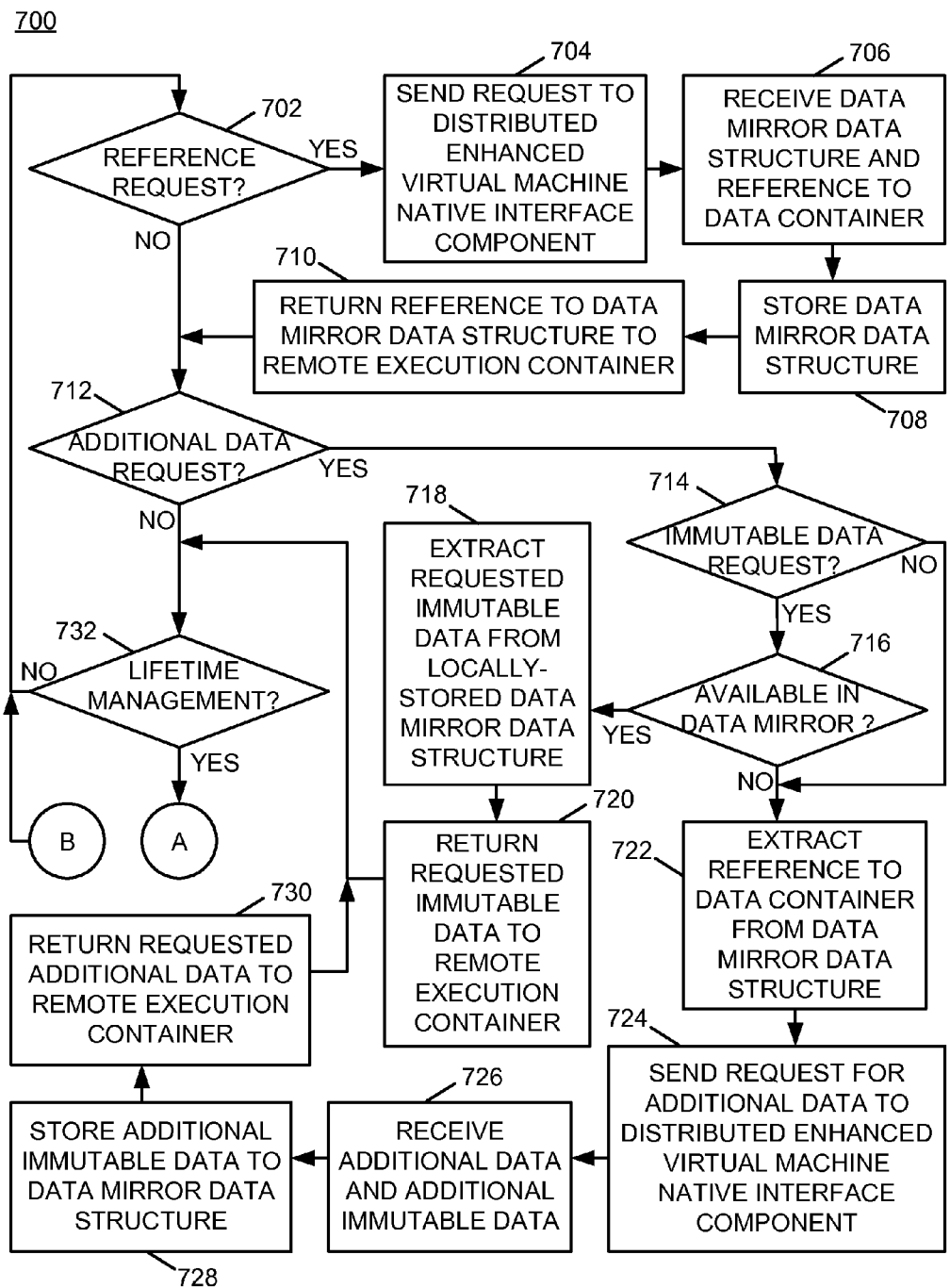
FIG. 7A is a flow chart of an example of an implementation of initial processing within a process for hidden automated data mirroring for native interfaces in distributed virtual machines at a distributed enhanced remote execution container (REC) Java™ Native Interface (JNI) module according to an embodiment of the present subject matter.
Figure 7B:
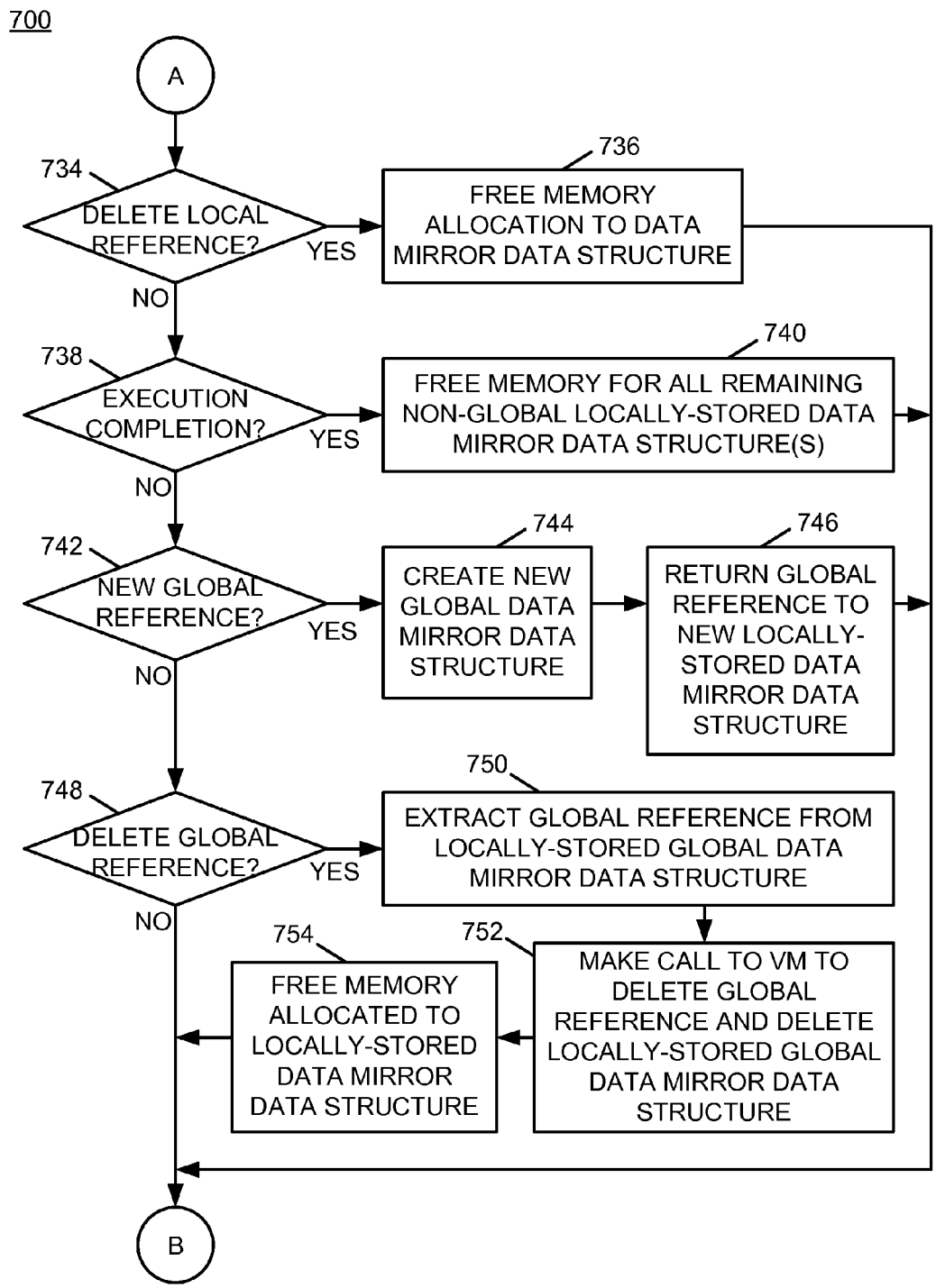
FIG. 7B is a flow chart of an example of an implementation of additional processing within a process for hidden automated data mirroring for native interfaces in distributed virtual machines at a distributed enhanced remote execution container (REC) Java™ Native Interface (JNI) module according to an embodiment of the present subject matter.

FIGS. 7A-7B illustrate a flow chart of an example of an implementation of a process 700 for hidden automated data mirroring for native interfaces in distributed virtual machines at a distributed enhanced remote execution container (REC) Java™ Native Interface (JNI) module, such as the distributed enhanced REC JNI component 214. FIG. 7A illustrates initial processing within the process 700. It should be noted that, as described above, processing of immutable data may be disabled during certain debugging operations, such as in association with the Java™ virtual machine tool interface (JVMTI). Due to crowding within the drawing space of FIGS. 7A and 7B, this debugging determination for enablement and disablement of immutable data processing has been omitted from the drawing figures. However, it is understood that this processing forms a portion of the process 700. Example processing for debug enablement determination is described below in association with FIG. 8 for reference.

At decision point 702, the process 700 makes a determination as to whether an initial request for a reference to a data container has been detected as being received from a remote execution container, such as from the remote execution container 110. The initial request may be, for example, an initial request for a class reference (e.g., a Find Class request as described above). In response to determining that an initial request for a reference to a data container has been detected, the process 700 sends the initial request for the reference to the data container to a distributed enhanced virtual machine native interface component of the distributed virtual machine, such as the distributed enhanced VM JNI component 216, at block 704.

At block 706, the process 700 receives a data mirror data structure including immutable data and the reference to the data container in response to the initial request for the reference to the data container. It should be noted that the reference to the data container may be embedded within the data mirror data structure. Additionally, as described above, the data mirror data structure may include all immutable data or the initial response may be optimized for bandwidth consumption by the distributed enhanced virtual machine component to use packet payload filling to send as much immutable data as may be delivered within a single packet, for example, to build the data mirror data structure over time without consuming partial packet payloads. As such, if certain portions of immutable data are not requested and are not initially sent by the distributed enhanced virtual machine native interface component, then these portions are not sent or stored within the locally-stored data mirror data structure.

At block 708, the process 700 stores the received data mirror data structure including the immutable data and the reference to the data container within a local memory storage area, such as the data mirror storage area 218 of the memory 210. At block 710, the process 700 returns a reference to the locally-stored data mirror data structure to the remote execution container in response to the initial request for the reference to the data container. As such, the remote execution container now has a reference to the locally-stored data mirror data structure that may be used for subsequent requests for data associated with the data container and any immutable data within the data mirror data structure may be retrieved from local storage without requiring an additional round-trip communication to retrieve the immutable data from the data container.

Returning to the description of decision point 702, in response to determining that an initial request for a reference to a data container has not been detected as being received from a remote execution container or in response to completion of returning the reference to the locally-stored data mirror data structure to the remote execution container at block 710, the process 700 makes a determination at decision point 712 as to whether a request from the remote execution container for an additional item of data associated with the data container has been detected. In response to determining that a request from the remote execution container for the additional item of data associated with the data container has been detected, the process 700 begins processing the request for the additional item of data associated with the data container and makes a determination at decision point 714 as to whether the requested additional item of data is for immutable data. In response to determining that the requested additional item of data is a request for immutable data, the process 700 makes a determination at decision point 716 as to whether the requested immutable data is available within the locally-stored data mirror data structure.

In response to determining that the request for the additional item of data associated with the data container comprises a request for immutable data that is available within the locally-stored data mirror data structure at decision point 716, the process 700 extracts the requested immutable data from the locally-stored data mirror data structure at block 718. It should be noted that this immutable data is extracted from the locally-stored data mirror data structure without making a call back to the distributed enhanced virtual machine native interface component when the requested data is immutable and the immutable data is stored in the data mirror data structure. At block 720, the process 700 returns the requested immutable data to the remote execution container in response to the request for the additional item of data. Additional processing within the process 700 after block 720 is described in more detail below.

Returning to the description of decision point 714, in response to determining that the requested additional item of data is not a request for immutable data or in response to determining at decision point 716 that the requested immutable data is not available within the locally-stored data mirror data structure, the process 700 extracts the reference to the data container returned with the data mirror data structure from the locally-stored data mirror data structure at block 722. At block 724, the process 700 sends the request for the additional item of data associated with the data container with the extracted reference to the data container to the distributed enhanced virtual machine native interface component of the distributed virtual machine. At block 726, the process 700 receives the requested additional item of data and additional immutable data from the distributed enhanced virtual machine native interface component of the distributed virtual machine. The additional immutable data may include immutable data that was not initially received with the data mirror data structure and may also include other immutable data items, such as variables that have been marked as "final" data values.

At block 728, the process 700 stores the additional immutable data to the locally-stored data mirror data structure. At block 730, the process 700 returns the requested additional item of data to the remote execution container. It should be noted that the requested additional item of data may be immutable or non-immutable data, but that the response bandwidth may be utilized to send additional immutable data to fill in the locally-stored data mirror data structure if all immutable data was not initially sent with the initial data mirror data structure.

Returning to the description of decision point 712, in response to determining that a request from the remote execution container for an additional item of data associated with the data container has not been detected, or in response to returning the requested additional item of data to the remote execution container at blocks 720 and/or 730, the process 700 makes a determination at decision point 732 as to whether a request to perform lifetime management of any locally-stored data mirror data structure has been detected, such as via a detection of a procedure, routine, or method call invocation. In response to determining that a request to perform lifetime management of any locally-stored data mirror data structure has been not detected, the process 700 returns to decision point 702 and iterates as described above. In response to determining that a request to perform lifetime management of any locally-stored data mirror data structure has been detected, the process 700 transitions to the processing shown and described in association with FIG. 7B to begin performing the requested lifetime management of the locally-stored data mirror data structure.

FIG. 7B illustrates additional processing associated with the process 700 for hidden automated data mirroring for native interfaces in distributed virtual machines at a distributed enhanced REC JNI module. At decision point 734, the process 700 makes a determination as to whether the detected request to perform lifetime management was a detection of an invocation of a call to a DeleteLocalReference routine that includes a reference to the locally-stored data mirror data structure as a parameter. In response to determining that an invocation of a call to a DeleteLocalReference routine has been detected, the process 700 frees memory allocated to the data mirror data structure using the reference to the data mirror data structure at block 736. The process 700 returns to the processing described in association with FIG. 7A at decision point 702 and iterates as described above.

Returning to the description of decision point 734, in response to determining that the detected request to perform lifetime management was not an invocation of a DeleteLocalReference routine, the process 700 makes a determination at decision point 738 as to whether the detected request to perform lifetime management was a detection of completion of execution of a native method in the remote execution container. In response to determining that completion of execution of the native method in the remote execution container was detected, the process 700 frees memory for all remaining non-global locally-stored data mirror data structures in the scope of that method at block 740. The process 700 returns to the processing described in association with FIG. 7A at decision point 702 and iterates as described above.

Returning to the description of decision point 738, in response to determining that the detected request to perform lifetime management was not a detection of completion of execution of the native method in the remote execution container, the process 700 makes a determination at decision point 742 as to whether the detected request to perform lifetime management was detection of an invocation of a call to a NewGlobalRef routine including a reference to the locally-stored data mirror data structure as a parameter. In response to determining that an invocation of a call to a NewGlobalRef routine was detected, the process 700 creates a new global data mirror data structure within the local memory storage area at block 744. Creation of the new global data mirror data structure involves several sub-steps that are represented within block 744 due to space limitations in the drawing figure. These sub-steps include a remote call to the virtual machine (VM) side of the distributed virtual machine (via the distributed enhanced virtual machine native interface) to obtain/get a global reference, and creating the new global data mirror data structure in response to receipt of the new global reference from the VM side. This remote call may be added to other JNI traffic, which may remove a round-trip communication between the respective processes. Further, this processing to create the new global data mirror data structure includes creating the new global data mirror data structure from the local data mirror data structure. Several alternatives exist for creating the global data mirror data structure from the local data mirror data structure. For example, the local data mirror data structure may be copied to the newly-created global data mirror data structure. Alternatively, the local data mirror data structure may be promoted to a global data mirror data structure, such as by replacing the local reference with the global reference. Additionally, the promoted global data mirror data structure may be moved to a global list in association with replacing the local reference with the global reference to create the global data mirror data structure. As such, many alternatives exist and all are considered within the scope of the present subject matter. Regardless of implementation, it is understood that the created global data mirror data structure encapsulates the reference to the data container returned from the distributed enhanced virtual machine native interface component of the distributed virtual machine and the immutable data from the locally-stored data mirror data structure. At block 746, the process 700 returns a global reference to the new locally-stored global data mirror data structure to the remote execution container. The process 700 returns to the processing described in association with FIG. 7A at decision point 702 and iterates as described above.

Returning to the description of decision point 742, in response to determining that the detected request to perform lifetime management was not detection of an invocation of a call to a NewGlobalRef routine, the process 700 makes a determination at decision point 748 as to whether the detected request to perform lifetime management was detection of an invocation of a call to a DeleteGlobalRef routine, including a reference to the new locally-stored global data mirror data structure as a parameter. In response to determining that an invocation of a call to a DeleteGlobalRef routine was detected, the process 700 extracts the global reference from the new locally-stored global data mirror data structure at block 750. At block 752, the process 700 makes a call to the virtual machine to delete the global reference and deletes the locally-stored global data mirror data structure. At block 754, the process 700 frees memory allocated to the locally-stored global data mirror data structure. The process 700 returns to the processing described in association with FIG. 7A at decision point 702 and iterates as described above. It is assumed for purposes of the present example that at least one of the described lifetime management actions will result in an affirmative determination and processing. As such, it is assumed that the negative branch of decision point 748 may not be executed, but in the event that the determination at decision point 748 is negative, the process 700 also returns to the processing described in association with FIG. 7A at decision point 702 and iterates as described above.

As such, the process 700 receives and locally stores data mirror data structures in response to sending initial requests for references to data containers to a distributed enhanced virtual machine native interface component of the distributed virtual machine. The process 700 also examines the locally-stored data mirror data structure in response to subsequent requests for immutable data and retrieves the requested immutable data from the locally-stored data mirror data structure if the data is locally available. Accordingly, the process 700 may reduce round-trip communications for immutable data. The process 700 also performs lifetime management of locally-stored data mirror data structures to manage local memory allocations.

Figure 8:
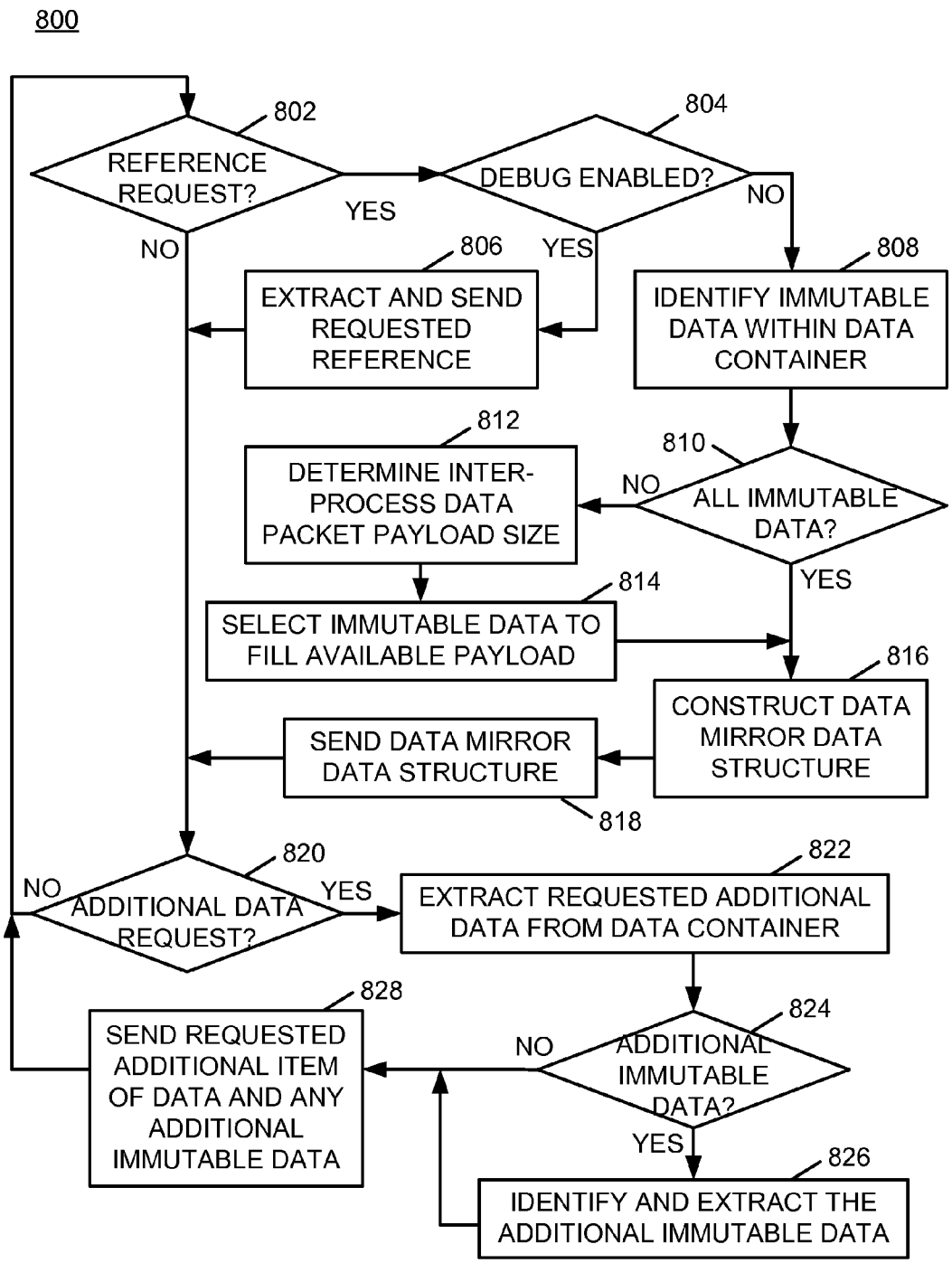
FIG. 8 is a flow chart of an example of an implementation of a process for hidden automated data mirroring for native interfaces in distributed virtual machines at a distributed enhanced virtual machine (VM) Java™ Native Interface (JNI) module according to an embodiment of the present subject matter.

FIG. 8 is a flow chart of an example of an implementation of a process 800 for hidden automated data mirroring for native interfaces in distributed virtual machines at a distributed enhanced virtual machine (VM) Java™ Native Interface (JNI) module, such as the distributed enhanced VM JNI component 216. At decision point 802, the process 800 makes a determination as to whether an initial request for a reference to a data container has been detected as being received from a distributed enhanced remote execution container native interface component of the distributed virtual machine, such as the distributed enhanced REC JNI component 214. The initial request may be, for example, an initial request for a class reference (e.g., a Find Class request as described above). In response to determining that an initial request for a reference to a data container has been detected, the process 800 makes a determination at decision point 804 as to whether debugging, such as via a Java™ virtual machine tool interface (JVMTI), is enabled. As noted above, this example processing is shown within FIG. 8 for reference in only one location at decision point 804. However, such processing may be implemented at any appropriate location associated with the processing as appropriate for the given implementation. In response to determining that debugging is enabled, the process 800 extracts and sends the requested reference at block 806. Additional processing associated with the process 800 after completion of sending the requested reference is deferred and described in detail further below.

Returning to the description of decision point 804, in response to determining that debugging is not enabled, the process 800 identifies immutable data within the data container at block 808. At decision point 810, the process 800 makes a determination as to whether to send all available immutable data or whether to send a portion of the available immutable data, such as for packet payload filling to conserve bandwidth. As such, the portion of the immutable data may include an amount of the immutable data selected based upon inter-process data packet payload size. In response to determining to send a portion of the available immutable data, the process 800 determines an available inter-process data packet payload size at block 812. At block 814, the process 800 selects immutable data to fill as much of the available payload as possible with minimal empty payload space to improve bandwidth usage. This processing may be performed, for example, in consideration of data type sizes. In situations with larger arrays or data structures within data containers, multiple packets may be used to send the data mirror data structure. In such situations, a second or subsequent packet may be processed to send additional immutable data to fill the available payload within the last packet to be sent with minimal empty payload space.

In response to completion of selecting the immutable data to be sent at block 814 or in response to determining to send all immutable data at decision point 810, the process 800 constructs a data mirror data structure that includes the identified/selected immutable data and the requested reference to the data container at block 816. This processing may include constructing the data mirror data structure of a size sufficient to fill the available inter-process data packet payload size of one or more data packets with minimal empty payload space. Additionally, the reference to the data container may be included/embedded within the data mirror data structure or may be packaged with the data mirror data structure for transmission. At block 818, the process 800 sends the data mirror data structure including the identified/selected immutable data and the requested reference to the data container to the requesting distributed enhanced remote execution container native interface component of the distributed virtual machine.

In response to completion of sending the data mirror data structure to the requesting distributed enhanced remote execution container component at block 818, in response to determining that an initial request for a reference to a data container has not be detected at decision point 802, or in response to extracting and sending the requested reference at block 806 (if in debug mode), the process 800 makes a determination at decision point 820 as to whether a request for an additional item of data within the data container has been detected. It should be noted that an additional determination regarding debug enablement may be made in response to an affirmative determination at decision point 820 and that this additional determination has been omitted from the drawing figure due to space limitations within the drawing sheet. In response to determining that a request for an additional item of data within the data container has not been detected, the process 800 returns to decision point 802 and iterates as described above.

In response to determining at decision point 820 that a request for an additional item of data within the data container has been detected, the process 800 extracts the requested additional item of data from the data container at block 822. It should be noted that the requested additional item of data from the data container may be immutable or non-immutable data.

At decision point 824, the process 800 makes a determination as to whether additional immutable data is available to send with the requested additional item of data from the data container. The additional immutable data may include, for example, immutable data that was not sent in response to the request for the initial reference to the data container, immutable data that was not sent in response to a previous request for additional data from the data container (e.g., due to packet payload optimizations), data variables that have been marked as "final" data values, and other forms of immutable data.

In response to determining that additional immutable data is available to send with the requested additional item of data, the process 800 identifies the additional immutable data and extracts the additional immutable data from the data container at block 826. In response to determining that no additional immutable data is available to send with the requested item of additional data at decision point 824, or in response to identifying and extracting the additional immutable data at block 826, the process 800 sends the requested additional item of data and any extracted additional immutable data to the distributed enhanced remote execution container native interface component of the distributed virtual machine in response to the request for the additional item of data within the data container at block 828. The process 800 returns to decision point 802 and iterates as described above.

As such, the process 800 responds to initial requests for references to a data container by identifying immutable data associated with the data container, generating a data mirror data structure, and sending the data mirror data structure with the reference to the data container to the requesting distributed enhanced remote execution container native interface component of the distributed virtual machine. The process 800 may package a portion of the available immutable data and may send any remaining immutable data in response to one or more requests for additional data items from the data container.

As described above in association with FIG. 1 through FIG. 8, the example systems and processes provide hidden automated data mirroring for native interfaces in distributed virtual machines. Many other variations and additional activities associated with hidden automated data mirroring for native interfaces in distributed virtual machines are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening 110 controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    at a distributed enhanced remote execution container native interface component of a distributed virtual machine:
        sending, in response to an initial request for a reference to a data container from a remote execution container, the initial request for the reference to the data container to a distributed enhanced virtual machine native interface component of the distributed virtual machine;
        storing a data mirror data structure comprising immutable data and the reference to the data container received from the distributed enhanced virtual machine native interface component within a local memory storage area; and
        returning a reference to the locally-stored data mirror data structure to the remote execution container in response to the initial request for the reference to the data container.

2. The method of claim 1, further comprising processing a request from the remote execution container for an additional item of data associated with the data container using the locally-stored data mirror data structure.

3. The method of claim 2, where processing the request from the remote execution container for the additional item of data associated with the data container using the locally-stored data mirror data structure comprises:
    determining that the request from the remote execution container for the additional item of data associated with the data container comprises a request for immutable data that is available within the locally-stored data mirror data structure;
    extracting the requested immutable data from the locally-stored data mirror data structure; and
    returning the requested immutable data to the remote execution container in response to the request for the additional item of data.

4. The method of claim 2, where processing the request from the remote execution container for the additional item of data associated with the data container using the locally-stored data mirror data structure comprises:
    determining that the request from the remote execution container for the additional item of data associated with the data container comprises a request for additional immutable data that is not available within the locally-stored data mirror data structure;
    sending a request for the additional immutable data that is not available within the locally-stored data mirror data structure to the distributed enhanced virtual machine native interface component of the distributed virtual machine;
    storing the additional immutable data in the locally-stored data mirror data structure in response to receiving the additional immutable data from the distributed enhanced virtual machine native interface component of the distributed virtual machine; and
    returning the additional immutable data to the remote execution container in response to the request for the additional item of data.

5. The method of claim 1, further comprising performing lifetime management of the locally-stored data mirror data structure.

6. The method of claim 5, where performing the lifetime management of the locally-stored data mirror data structure comprises:
    detecting an invocation of a call to a NewGlobalReference routine comprising a reference to the locally-stored data mirror data structure as a parameter; and
    creating a new locally-stored global data mirror data structure in response to the invocation of the call to the NewGlobalReference routine using the reference to the locally-stored data mirror data structure.

7. The method of claim 6, where creating the new locally-stored global data mirror data structure in response to the invocation of the call to the NewGlobalReference routine using the reference to the locally-stored data mirror data structure comprises:

obtaining a new global reference from the distributed enhanced virtual machine native interface component of the distributed virtual machine; and creating the new locally-stored global data mirror data structure from the locally-stored data mirror data structure in response to receipt of the new global reference from the distributed enhanced virtual machine native interface component of the distributed virtual machine.

8. The method of claim 7, where creating the new locally-stored global data mirror data structure from the locally-stored data mirror data structure in response to receipt of the new global reference from the distributed enhanced virtual machine native interface component of the distributed virtual machine comprises:

promoting the locally-stored data mirror data structure to the new locally-stored global data mirror data structure; and replacing the reference to the locally-stored data mirror data structure with the new global reference.

9. A computer readable storage medium storing instructions which, when executed on one or more programmed processors, carry out the method according to claim 1, where the computer readable storage medium is not a transitory signal per se.

10. A method, comprising:

at a distributed enhanced virtual machine native interface component of a distributed virtual machine:

identifying immutable data within a data container in response to an initial request for a reference to the data container from a distributed enhanced remote execution container native interface component of the distributed virtual machine;

constructing a data mirror data structure that comprises the identified immutable data and the requested reference to the data container; and returning the data mirror data structure comprising the identified immutable data and the requested reference to the data container to the distributed enhanced remote execution container native interface component of the distributed virtual machine.

11. The method of claim 10, where constructing the data mirror data structure that comprises the identified immutable data and the requested reference to the data container comprises constructing the data mirror data structure with a portion of the immutable data.

12. The method of claim 10, further comprising:

receiving a request for an additional item of data from the data container;

extracting the requested additional item of data from the data container; and returning the requested additional item of data in response to the request for the additional item of data from the data container.

13. The method of claim 12, where returning the requested additional item of data in response to the request for the additional item of data from the data container comprises returning one of an additional item of non-immutable data from the data container and an additional item of immutable data.

14. A computer readable storage medium storing instructions which, when executed on one or more programmed processors, carry out the method according to claim 10, where the computer readable storage medium is not a transitory signal per se.

15. A system, comprising:

a memory; and a processor programmed to execute a distributed enhanced remote execution container native interface component of a distributed virtual machine configured to:

send, in response to an initial request for a reference to a data container from a remote execution container, the initial request for the reference to the data container to a distributed enhanced virtual machine native interface component of the distributed virtual machine;

store a data mirror data structure comprising immutable data and the reference to the data container received from the distributed enhanced virtual machine native interface component locally within the memory; and return a reference to the locally-stored data mirror data structure to the remote execution container in response to the initial request for the reference to the data container.

16. The system of claim 15, where the processor is further programmed to process a request from the remote execution container for an additional item of data associated with the data container using the locally-stored data mirror data structure.

17. The system of claim 15, where the processor is further programmed to perform lifetime management of the locally-stored data mirror data structure.

18. A system, comprising:

a communication module; and a processor programmed to execute a distributed enhanced virtual machine native interface component of a distributed virtual machine configured to:

identify immutable data within a data container in response to an initial request for a reference to the data container from a distributed enhanced remote execution container native interface component of the distributed virtual machine;

construct a data mirror data structure that comprises the identified immutable data and the requested reference to the data container; and return, via the communication module, the data mirror data structure comprising the identified immutable data and the requested reference to the data container to the distributed enhanced remote execution container native interface component of the distributed virtual machine.

19. The system of claim 18, where, in being programmed to construct the data mirror data structure that comprises the identified immutable data and the requested reference to the data container, the processor is programmed to construct the data mirror data structure with a portion of the immutable data.

20. The system of claim 18, where the processor is further programmed to:

receive a request for an additional item of data from the data container;

extract the requested additional item of data from the data container; and return the requested additional item of data in response to the request for the additional item of data from the data container.

* * * * *